US006400883B1

(12) United States Patent
Jennings et al.

(10) Patent No.: US 6,400,883 B1
(45) Date of Patent: Jun. 4, 2002

(54) FIBER DISTRIBUTION FRAME WITH INTEGRAL ACTIVE ELECTRICAL PANEL

(75) Inventors: Mark R. Jennings, Handover; Richard Pimpinella, Hampton; Frank S. Leone, Berkeley Heights, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 9 days.

(21) Appl. No.: 09/675,919

(22) Filed: Sep. 29, 2000

(51) Int. Cl.[7] .................................................. G02B 6/00
(52) U.S. Cl. ...................................................... 385/134
(58) Field of Search ................................. 385/134, 147

(56) References Cited

U.S. PATENT DOCUMENTS

| | | | | |
|---|---|---|---|---|
| 5,461,693 A | * | 10/1995 | Pimpinella | 359/115 |
| 5,570,450 A | * | 10/1996 | Fernandez et al. | 385/134 |
| 5,689,604 A | * | 11/1997 | Janus et al. | 385/134 |
| 5,717,810 A | * | 2/1998 | Wheeler | 385/134 |
| 5,917,982 A | * | 6/1999 | Vargas et al. | 385/134 |
| 5,937,131 A | * | 8/1999 | Haataja et al. | 385/134 |
| 5,995,699 A | * | 11/1999 | Vargas et al. | 385/134 |
| 6,061,492 A | * | 5/2000 | Strause et al. | 385/134 |
| 6,236,795 B1 | * | 5/2001 | Rodgers | 385/134 |

* cited by examiner

Primary Examiner—Tulsidas Patel
(74) Attorney, Agent, or Firm—Gibbons, Del Deo, Dolan, Griffinger & Vecchione

(57) ABSTRACT

A method is provided for utilization of previously unusable space within an optical fiber distribution frame for electrical fuses, power, ground, and electrical communications and control for optical fiber management. These components as well as optical fiber installation tools, maintenance tools, and spare parts are housed within spaces defined by upper and lower raceways.

17 Claims, 2 Drawing Sheets

FIBER DISTRIBUTION FRAME WITH INTEGRAL ACTIVE ELECTRICAL PANEL

FIELD OF THE INVENTION

This invention relates to optical fiber handling systems, and more particularly to optical fiber distribution frames having integral intelligent elements.

BACKGROUND OF THE INVENTION

Many telecommunications applications utilize an optical fiber network of interconnected optical fiber cables to enable optical communications between network locations. Ordinarily, a unique fiber routing will be required to transmit light pulses between network locations. Over this unique route, light pulses may be propagated across several different fibers. At each transition from one fiber to another, individual fibers are connected, thereby enabling light pulses to be carried between a first fiber and a second fiber. In many cases, such as at a central office for the communications system, large numbers of fiber connections must be made and a fiber administration system is employed to manage the various connections.

In many fiber administration systems, as the optical fibers in a network enter the central office, they are directed into an optical fiber distribution frame (FDF) where the individual optical fibers are terminated in an organized manner. Such fiber administration systems are exemplified by the LGX® fiber administration system that is currently manufactured by Lucent Technologies of Murray Hill, N.J., the assignee herein.

The FDF accommodates the placement and management of optical jumpers for interconnecting or cross connecting optical transmission equipment and outside plant (OSP) fibers. The FDF typically includes an upright structural framework or support member, a space or bay within the support member to hold racks or shelves of terminal equipment, a pair of distribution rings adjacent each shelf to convey fibers vertically, and an upper and lower raceway, each having space to convey fibers horizontally to the terminal equipment. The upper raceway further includes an arcuate support member at each end for supporting the optical fibers and guiding them through a minimum radius in transition from vertical to horizontal. That minimum radius corresponds to the minimum bend radius for the fiber (a radius determined to avoid damage to, or light leakage from a fiber which can occur with a bend in the fiber exceeding that radius). A minimum bend radius of at least two inches is generally considered safe, and is typical.

Heretofore, FDF frames comprised passive optical jumpers with few if any electrical components. Recent practice has been to manage the OSP by including test modules containing active electrical components, or intelligent elements, within the FDF frame. Such test modules may include one or more optical switches, a remote test unit, a monitor, a writing shelf and keyboard, a test system control, a modem, and a printer. To support the intelligent elements within the FDF, it is now necessary to provide power, ground, and electrical communications.

The trend in recent years has been to pack ever increasing numbers of optical fibers into a FDF raceway. The resulting high fiber density has made it very difficult to locate test or support modules in the portion of the FDF occupied by the fiber distribution shelves because the cable density makes severely limits access to such modules. Moreover, open space for intelligent elements is highly limited.

Accordingly, there is a need to provide an optical fiber distribution frame having integral intelligent elements within the physical envelope of the FDF.

There is a further need to provide an optical fiber distribution frame of the type described and that includes space for the intelligent elements while maintaining accessibility for installing and removing optical fiber jumpers; and There is a yet further need to provide an optical fiber distribution frame of the type described and that includes power, ground, and electrical communications for the intelligent elements.

SUMMARY OF THE INVENTION

In accordance with the present invention, there is provided a fiber distribution frame comprising an upright support member having opposite upper and lower ends, and opposite left and right sides. An upper raceway is located adjacent the upright support member upper end. The upper raceway has opposite left and right ends adjacent the upright support member left and right ends respectively. The upper raceway also has opposite left and right arcuate support members adjacent the upper raceway left and right ends respectively, for supporting and guiding optical fibers. The arcuate support members each have a predetermined radius. The upper raceway and the arcuate support members together define a first space that is adapted to receive at least one active electrical component.

In a further embodiment, a lower raceway is provided adjacent the upright support member lower end. The lower raceway has opposite left and right ends adjacent the upright support member left and right ends respectively. The lower raceway defines a second space that may also be adapted to receive at least one active electrical component.

BRIEF DESCRIPTION OF THE DRAWING

A more complete understanding of the present invention may be obtained from consideration of the following description in conjunction with the drawing, in which.

DESCRIPTION OF THE PREFERRED EMBODIMENTS

As explained in the Background section, the upper raceway of the FDF (and, as well, a lower raceway) includes an arcuate support member at each end for supporting the optical fibers and guiding them through a minimum radius in transition from vertical to horizontal. That minimum radius is typically on the order of two inches, leaving open space beneath the raceway and between the arcuate members. According to the invention, that open space may be adapted for receiving an electrical component.

Figure 1:
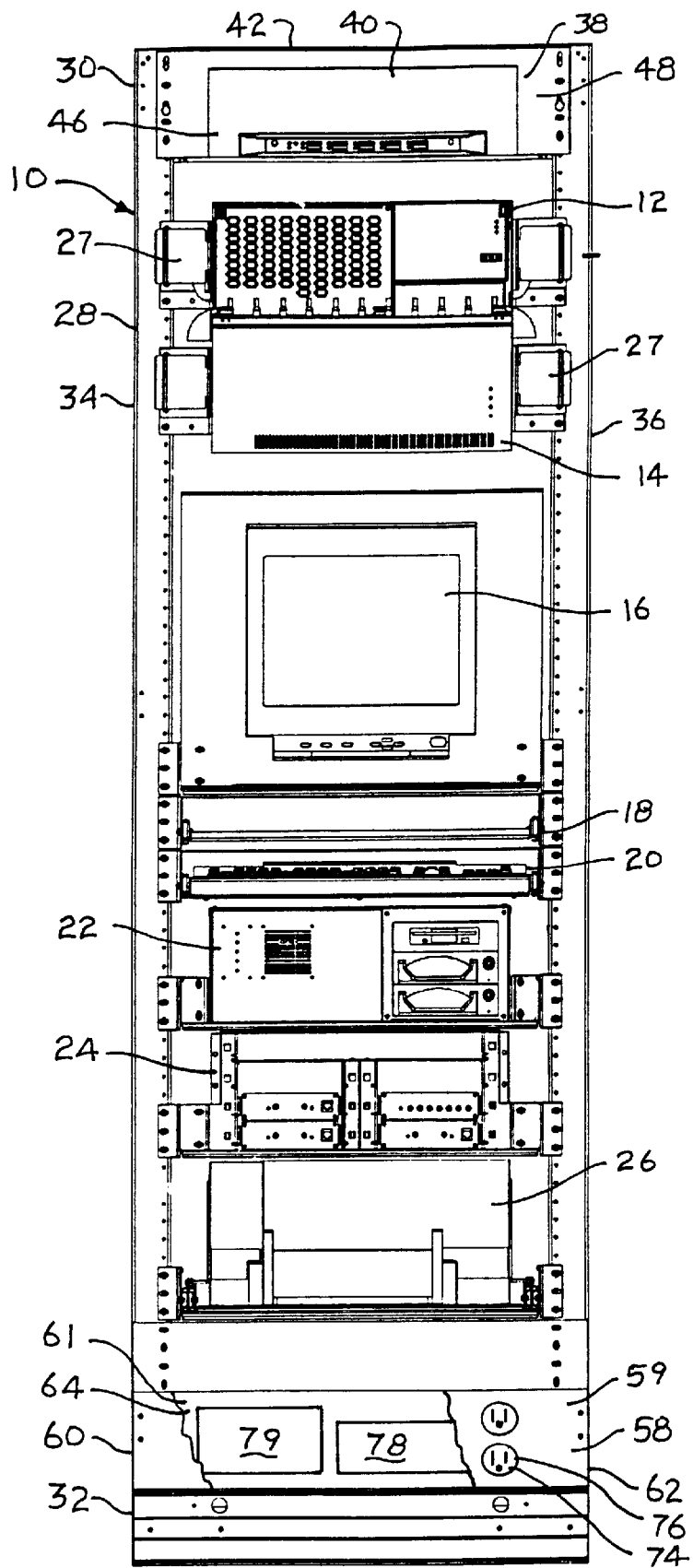
FIG. 1 is a front elevational view of an optical fiber distribution frame with an integral fuse panel and controller constructed in accordance with the invention.

Referring now to the drawings, and especially to FIG. 1, an FDF is shown at 10, and features OSP management test modules including an optical switch 12, a remote test unit 14, a monitor 16, a writing shelf 18, a keyboard 20, a test system control 22, a modem 24, and a printer 26. Distribution rings 27 are shown adjacent to the optical switch 12, and the remote test unit 14. Optical fibers have been omitted from FIG. 1 for clarity.

Figure 2:
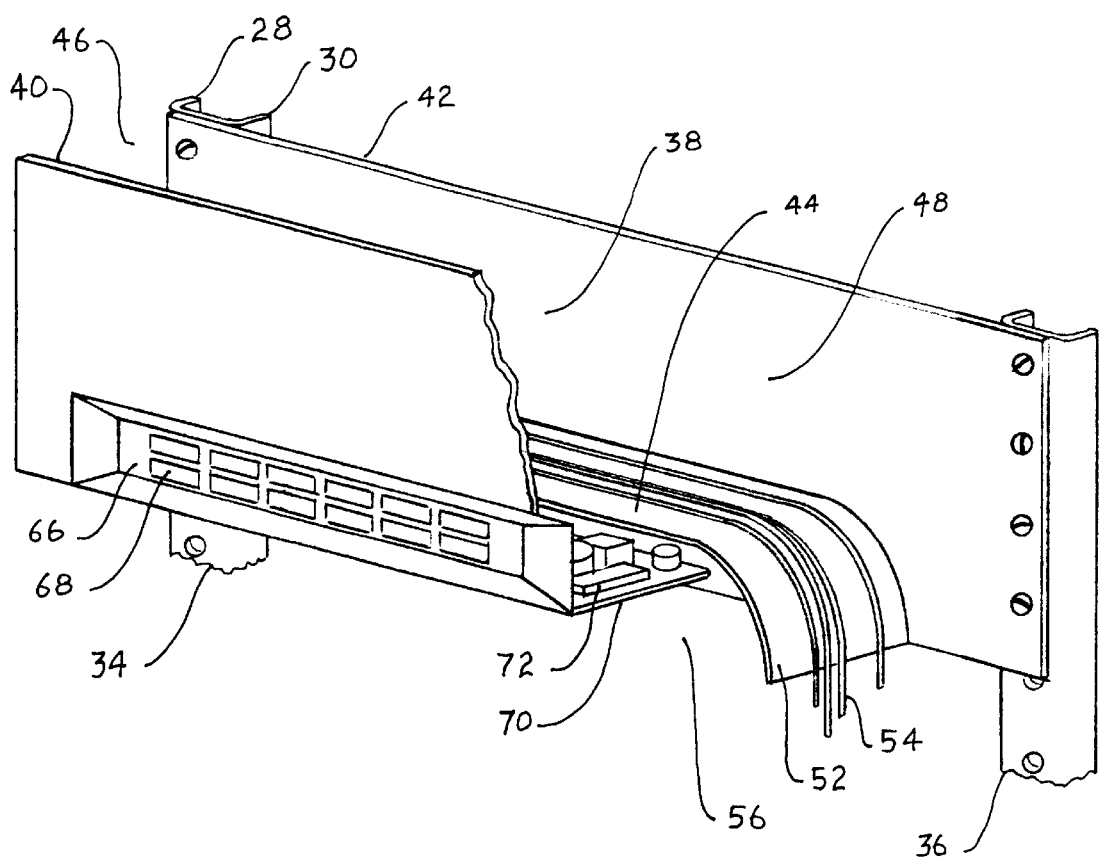
FIG. 2 is an isometric, partially cut-away view of the upper raceway of the optical fiber distribution frame of FIG. 1.

Considering FIG. 2 along with FIG. 1, the FDF includes an upright support member 28 having opposite upper 30 and lower 32 ends, and opposite left 34 and right 36 sides. An upper raceway 38 is disposed adjacent the upright support member upper end 30. The upper raceway 38 is a trough comprised of a front panel 40, a rear panel 42, and a floor panel 44. The upper raceway 38 has opposite left 46 and right 48 ends adjacent the upright support member left 34 and right 36 sides respectively. The upper raceway 38 has opposite left 50 (not shown) and right 52 arcuate support members adjacent the upper raceway left 46 and right 48 ends respectively, for supporting and guiding optical fibers 54. The arcuate support members 50 and 52 each have a predetermined radius. The upper raceway 38 and the arcuate support members 50 and 52 together define a first space 56.

A lower raceway 58 is disposed adjacent the upright support member lower end 32. The lower raceway 58 has opposite left 60 and right 62 ends adjacent the upright support member left 34 and right 36 sides respectively. The lower raceway 58 has a front panel 59 and a rear panel 61. The lower raceway 58 defines a second space 64.

At least one active electrical component, and typically several components, are housed within at least one of the first 56 and second 64 spaces. FIG. 2 depicts a fuse panel 66 having a plurality of electrical fuses 68, and electrical communication and control apparatus 70 having active electrical components 72, mounted within the first space 56. This novel arrangement allows efficient use of the hitherto unused first space 56 for optical fiber management.

An electrical AC outlet 74 and a ground connection 76 may be housed within at least one of the first 56 and second 64 spaces, along with optical fiber installation and maintenance tools 78, and spare parts 80.

According to the invention, a method is disclosed for integrating active electronic components within an optical fiber distribution frame. The method comprises the steps of: providing an upright support member 28 on the optical fiber distribution frame 10; extending an upper raceway 38 between opposite left 46 and right 48 ends; locating the upper raceway 38 adjacent an upper end 30 of the upright support member 28; juxtaposing a left arcuate support member 50 adjacent the left end 46 of the upper raceway 38; juxtaposing a right arcuate support member 52 adjacent the right end 48 of the upper raceway 38; defining a first space 56 within the upper raceway 38 and the arcuate support members 50 and 52; extending a lower raceway 58 between opposite left 60 and right 62 ends; locating the lower raceway 58 adjacent a lower end 32 of the upright support member 28; defining a second space 64 within the lower raceway 58; and housing at least one active electrical component 72 within at least one of the first 56 and second 64 spaces.

In a further embodiment, the method of the invention includes housing an electrical fuse panel 66 within at least one of the first 56 and second 64 spaces.

In a still further embodiment, the method of the invention includes housing an electrical AC outlet 74 and a ground connection 76 within at least one of the first 56 and second 64 spaces.

For a yet further embodiment, the method of the invention includes housing electrical communication and control components 70 within at least one of the first 56 and second 64 spaces, for optical fiber management.

In another embodiment, the method of the invention includes housing optical fiber installation tools 78, maintenance tools 78, and spare parts 80 within at least one of the first 56 and second 64 spaces.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which will come within the scope of the appended claims is reserved.

What is claimed:

1. A Fiber Distribution Frame, comprising:
   an upright support member having opposite upper and lower ends, and opposite left and right sides;
   an upper raceway adjacent the upright support member upper end, the upper raceway having opposite left and right ends adjacent the upright support member left and right sides respectively, the upper raceway having opposite left and right arcuate support members adjacent the upper raceway left and right ends respectively, for supporting and guiding optical fibers, the arcuate support members each having a predetermined radius, the upper raceway and the arcuate support members together defining a first space; and
   wherein the first space is adapted to house at least one active electrical component.

2. The Fiber Distribution Frame of claim 1, further comprising a lower raceway adjacent the upright support member lower end, the lower raceway having opposite left and right ends adjacent the upright support member left and right sides respectively, the lower raceway defining a second space;
   wherein the second space is adapted to house at least one active electrical component.

3. The Fiber Distribution Frame of claim 2, further comprising an electrical fuse panel housed within at least one of the first and second spaces.

4. The Fiber Distribution Frame of claim 2, further comprising an electrical AC outlet and a ground connection housed within at least one of the first and second spaces.

5. The Fiber Distribution Frame of claim 2, further comprising electrical communication and control components housed within at least one of the first and second spaces, for optical fiber management.

6. The Fiber Distribution Frame of claim 2, further comprising optical fiber installation tools, maintenance tools, and spare parts housed within at least one of the first and second spaces.

7. A Fiber Distribution Frame, comprising:
   an upright support member having opposite upper and lower ends, and opposite left and right sides;
   an upper raceway adjacent the upright support member upper end, the upper raceway having opposite left and right ends adjacent the upright support member left and right sides respectively, the upper raceway having opposite left and right arcuate support members adjacent the upper raceway left and right ends respectively, for supporting and guiding optical fibers, the arcuate support members each having a predetermined radius, the upper raceway and the arcuate support members together defining a first space; and
   an electrical fuse panel and bay controller housed within the first space.

8. The Fiber Distribution Frame of claim 7, further comprising a lower raceway adjacent the upright support member lower end, the lower raceway having opposite left and right ends adjacent the upright support member left and right sides respectively, the lower raceway defining a second space.

9. The Fiber Distribution Frame of claim 8, further comprising an electrical AC outlet and a ground connection housed within at least one of the first and second spaces.

10. The Fiber Distribution Frame of claim 8, further comprising electrical communication and control components housed within at least one of the first and second spaces, for optical fiber management.

11. The Fiber Distribution Frame of claim 8, further comprising optical fiber installation tools, maintenance tools, and spare parts housed within at least one of the first and second spaces.

12. A method of integrating active electronic components within an optical fiber distribution frame, the method comprising the steps of:

providing an upright support member on the optical fiber distribution frame;

extending an upper raceway between opposite left and right ends;

locating the upper raceway adjacent an upper end of the upright support member;

juxtaposing a left arcuate support member adjacent the left end of the upper raceway;

juxtaposing a right arcuate support member adjacent the right end of the upper raceway;

defining a first space within the upper raceway and the arcuate support members; and housing at least one active electrical component within the first space.

13. The method of claim 12, further comprising the steps of extending a lower raceway between opposite left and right ends;

locating the lower raceway adjacent a lower end of the upright support member;

defining a second space within the lower raceway; and housing at least one active electrical component within the second space.

14. The method of claim 13, further comprising the step of housing an electrical fuse panel within at least one of the first and second spaces.

15. The method of claim 13, further comprising the step of housing an electrical AC outlet and a ground connection within at least one of the first and second spaces.

16. The method of claim 13, further comprising the step of housing electrical communication and control components within at least one of the first and second spaces, for optical fiber management.

17. The method of claim 13, further comprising the step of housing optical fiber installation tools, maintenance tools, and spare parts within at least one of the first and second spaces.

* * * * *